United States Patent
Ishiai

(10) Patent No.: US 7,525,556 B2
(45) Date of Patent: Apr. 28, 2009

(54) DATA CREATING DEVICE, DATA REPRODUCING DEVICE, DATA PROCESSING SYSTEM, AND METHODS THEREFOR

(75) Inventor: Katsuhiro Ishiai, Kanagawa (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 10/503,014

(22) PCT Filed: Jan. 31, 2003

(86) PCT No.: PCT/JP03/01013

§ 371 (c)(1),
(2), (4) Date: Jul. 29, 2004

(87) PCT Pub. No.: WO03/065311

PCT Pub. Date: Aug. 7, 2003

(65) Prior Publication Data

US 2005/0104903 A1    May 19, 2005

(30) Foreign Application Priority Data

Jan. 31, 2002    (JP)    ............................. 2002-022800

(51) Int. Cl.
G09G 5/00    (2006.01)
(52) U.S. Cl. ..................... 345/629; 725/41; 715/201
(58) Field of Classification Search ......... 715/723–726, 715/705; 345/473
See application file for complete search history.

(56) References Cited

U.S. PATENT DOCUMENTS

| | | | | |
|---|---|---|---|---|
| 4,724,491 A | | 2/1988 | Lambert | |
| 5,682,326 A | * | 10/1997 | Klingler et al. | 715/500.1 |
| 5,761,601 A | | 6/1998 | Nemirofsky et al. | |
| 5,999,173 A | * | 12/1999 | Ubillos | 715/724 |
| 6,072,503 A | * | 6/2000 | Tani et al. | 345/473 |
| 6,744,968 B1 | * | 6/2004 | Imai et al. | 386/52 |
| 6,954,894 B1 | * | 10/2005 | Balnaves et al. | 715/500.1 |
| 7,020,381 B1 | * | 3/2006 | Kato et al. | 386/52 |

FOREIGN PATENT DOCUMENTS

| | | |
|---|---|---|
| EP | 0 627 690 | 12/1994 |
| EP | 0 891 081 | 1/1999 |
| GB | 2 328 105 | 2/1999 |
| JP | 7-152900 | 6/1995 |
| JP | 9-146918 | 6/1997 |
| JP | 2000 101647 | 4/2000 |
| JP | 2000 259650 | 9/2000 |
| JP | 2001 8163 | 1/2001 |
| JP | 2001 16567 | 1/2001 |
| WO | WO 98 41936 | 9/1998 |

* cited by examiner

*Primary Examiner*—Kee M. Tung
*Assistant Examiner*—Michelle K Lay
(74) *Attorney, Agent, or Firm*—Frommer Lawrence & Haug LLP; William S. Frommer; Thomas F. Presson

(57) ABSTRACT

An RFD data creation apparatus 1 generates RFD data, for respective identification data of a plurality of content data, indicating by associating the identification data, reproduction timing of content data corresponding to the identification data in a reproduction apparatus 9, and data for specifying other content data to be reproduced simultaneously with the content data corresponding to the identification data by the reproduction apparatus 9, and transmits to the reproduction apparatus 9 via a network 8.

18 Claims, 20 Drawing Sheets

FIG. 7

| CONTENT SELECTION WINDOW | | | | | | | | | | | | | | | |
|---|---|---|---|---|---|---|---|---|---|---|---|---|---|---|---|
| SELECTION OF TERMINAL FOR DISPLAYING LIST: PC | | | | TRANSMISSION DESTINATION: ○○○ 参照 | | | | | | | | | | | |
| MOVING IMAGE LIST | | | | MOVING IMAGE LIST | | | | TELOP LIST | | | | EXTERNAL DEVICE CONTROL LIST | | PLAY LIST | |
| No | T1 | S | | No | T1 | S | | No | T2 | CN | | No | T2 | I | | No | T1 | IN |
| 01 | WWW | 00:01:12 | | 01 | WWW | 500KB | | 01 | WWW | 10 | | 01 | WWW | PDP | | 01 | WWW | 10 |
| 02 SAMPLE2 00:01:12 | | | | 02 SAMPLE2 500KB | | | | 02 SAMPLE2 10 | | | | 02 SAMPLE2 GP1 | | | | 02 SAMPLE2 10 |
| 03 SAMPLE3 00:01:12 | | | | 03 SAMPLE3 500KB | | | | 03 SAMPLE3 10 | | | | 03 SAMPLE3 PDP | | | | 03 SAMPLE3 10 |
| 04 SAMPLE4 00:01:12 | | | | 04 SAMPLE4 500KB | | | | 04 SAMPLE4 10 | | | | 04 SAMPLE4 GP1 | | | | 04 SAMPLE4 10 |
| 05 SAMPLE5 00:01:12 | | | | 05 SAMPLE5 500KB | | | | 05 SAMPLE5 10 | | | | 05 SAMPLE5 PDP | | | | 05 SAMPLE5 10 |
| 06 SAMPLE6 00:01:12 | | | | 06 SAMPLE6 500KB | | | | 06 SAMPLE6 10 | | | | 06 SAMPLE6 PDP | | | | 06 SAMPLE6 10 |
| R | IR | TR | | R | IR | TR | | R | IR | TR | | R | IR | TR | | R | IR | IR |

| RFD CREATION WINDOW | | | | | | |
|---|---|---|---|---|---|---|
| RFD NAME: SAMPLE2 | | | | | | |
| 2002/○○/×× | 06:00:00 | 06:00:25 | 06:00:30 | 06:00:50 | 07:00:00 | 07:01:00 |
| MOVING IMAGE | | | | | | |
| MOVING IMAGE | | | | | | |
| TELOP | | | | | | |
| EXTERNAL DEVICE CONTROL | | | | | | |

FIG. 9

| No | NUMBER OF BYTES | ITEM NAME | CONTENT |
|---|---|---|---|
| 01 | 2+1 | FILE VERSION | 01 |
| 02 | 4+1 | COUNTRY CODE | 4 DIGITS |
| 03 | 40+1 | TITLE NAME | 40 BYTES |
| 04 | 19+1 | UPDATE DATE AND TIME | YYYY/MM/DD/ HH:MM:SS |
| 05 | 10+1 | AUTOMATIC DELETION DATE | YYYY/MM/DD |
| 06 | 1+1 | NEW ARRIVAL CLASSIFICATION | 0: OFF, 1: ON |
| 07 | 46 | RESERVATION FIELD | BYTES UNDER 128-BYTE BOUNDARY |
| * | VARIABLE LENGTH | DATA PORTION | |

FIG. 10

| No | ITEM NAME | CONTENT |
|---|---|---|
| H01 | FILE VERSION | FOR CHECKING COMPATIBILITY WHEN EXTENDED |
| H02 | COUNTRY CODE | JAPANESE AND OTHERS |
| B01 | TITLE NAME | 40 BYTES (VARIABLE LENGTH) |
| B02 | UPDATE DATE AND TIME | YYYY/MM/DD/ HH:MM:SS |
| B03 | NUMBER OF CHARACTERS | (CALCULATED IN HALF-WIDTH) |
| B04 | DISPLAY CLASSIFICATION | 1:ALWAYS, 2:BLINKING, 3:SCROLL, 4:SCROLL-IN |
| B05 | BACKGROUND COLOR ASSIGNMENT | $\alpha$RGB |
| B06 | CHARACTER COLOR ASSIGNMENT | $\alpha$RGB |
| B07 | TELOP CONTENT | 200 CHARACTERS IN HALF-WIDTH AT MAXIMUM |

FIG. 11

| No | ITEM NAME | CONTENT |
|---|---|---|
| H01 | FILE VERSION | FOR CHECKING COMPATIBILITY WHEN EXTENDED |
| H02 | COUNTRY CODE | JAPANESE AND OTHERS |
| B02 | TITLE NAME | 40 BYTES (VARIABLE LENGTH) |
| B03 | UPDATE DATE AND TIME | YYYY/MM/DD/ HH:MM:SS |
| B04 | CONTROL CLASSIFICATION | 1:GPI OUTPUT, 2:PDP CONTROL |
| B05 | CONTROL CONTENT | 1: GPI OUTPUT (DISPLAYED BY 3-DIGIT NUMBER) SIGNAL NUMBER, START/END, BEFORE/AFTER<br>2: PDP CONTROL (EXPRESSED BY 2-DIGIT NUMBER) INPUT SWITCHING, NONE |

FIG. 13

| No | RFD ITEM NAME | TRANSMISSION LOG ITEM NAME | CONTENT |
|---|---|---|---|
| 01 | SPECIAL SETTING | SPECIAL SETTING | POWER-ON REPRODUCTION (1), ONE-TOUCH REPRODUCTION (2). ※SET ONLY BY REMOTE COMMANDER |
| 02 | TOTAL NUMBER OF EVENTS | TOTAL NUMBER OF EVENTS | 3000 AT MAXIMUM |
| 03 | ATTRIBUTES | — | SCHEDULE (1), EXTERNAL TRIGGER (2) |
| 04 | REPETITION | REPETITION | NORMAL(0), REPEAT(1) |
| 05 | TRANSMISSION START DATE AND TIME | TRANSMISSION START DATE AND TIME | YYYY/MM/DD HH:MM:SS |
| 06 | TRANSMISSION END DATE AND TIME | TRANSMISSION END DATE AND TIME | YYYY/MM/DD HH:MM:SS |
| 07 | TRANSMISSION DAY DESIGNATION | — | EXPRESSING BIT ASSIGNMENT IN HEXADECIMAL BY NUMBER (0 TO 64): SAUNDAY (0000 0001) TO SATURDAY (0100 0000) 0" INDICATES TRANSMITTING EVERYDAY |
| 08 |  | NUMBER OF REPETITION | MAXIMUM : 9999 |
| 09 | RESERVATION FIELD | RESERVATION FIELD | BYTES UNDER 64-BYTE BOUNDARY |
| * | DATA PORTION | DATA PORTION |  |

FIG. 14

| No | RFD ITEM NAME | TRANSMISSION LOG ITEM NAME | CONTENT |
|---|---|---|---|
| 01 | NUMBER | NUMBER | No. xxx |
| 02 | FILE CLASSIFICATION | FILE CLASSIFICATION | 00:COMMENT, 1x:MOVING IMAGE, 20:STILL IMAGE, 3x:TELOP, 4x:EXTERNAL DEVICE CONTROL<br>MOVING IMAGE··· 11: MOVING IMAGE , 12:ONLY AUDIO<br>TELOP··· 31:ALWAYS, 32:BLINKING, 33:SCROLL, 34:SCROLL-IN<br>EXTERNAL DEVICE CONTROL ···41:GPI CONTROL, 42: PDP CONTROL |
| 03 | FILE NAME | — | IDENTIFICATION DATA OF CONTENT DATA |
| 04 | TITLE NAME | TITLE NAME | HALF-WIDTH :40, FULL-WIDTH :20, [COMMENT FIELD] |
| 05 | TRANSMISSION TIME | TRANSMISSION TIME | 00:00:00:00 - 48:00:00:00 |
| 06 | SCHEDULED DATE AND TIME OF TRANSMISSION (START SPOTTING) | SCHEDULED DATE AND TIME OF TRANSMISSION | JAPAN: YYYY/MM/DD/ HH:MM:SS:FF<br>OTHERS: MM/DD/YYYY/ HH:MM:SS:FF |
| 07 | SPOT ACCUMULATION TIME | | |
| 08 | DISPLAY POSITION<br>SPEED<br>GPI<br>PDP | | MOVING IMAGE:X-COORDINATE (0-720), Y-COORDINATE(0-NTSC:480, PAL:576)<br>TELOP : SPEED(1-?), Y-COORDINATE (0-NTSC:480-32, PAL:576-32)<br>EXTERNAL CONTROL : GPI-OUT1CONTROL, GPI-OUT2CONTROL<br>EXTERNAL CONTROL : TURNING ON/OFF OF PDP |
| 09 | DISPLAY SIZE<br>GPI<br>PDP | | MOVING IMAGE:HORIZONTAL DIRECTION(0-720), VERTICAL DIRECTION(0-NTSC:480, PAL:576)<br>TELOP: NONE<br>EXTERNAL CONTROL : GPI-OUT3CONTROL, GPI-OUT4CONTROL<br>EXTERNAL CONTROL : INPUT SWITCHING (1 TO 3) OF PDP |
| 10 | START POSITION | | START POINT OF TRIMMING MPEG2 FILE |
| 11 | MOVING IMAGE DEPENDENCY RELATIONSHIP | | RELATED EVENT NUMBER |
| 12 | STILL IMAGE DEPENDENCY RELATIONSHIP | | RELATED EVENT NUMBER |
| 13 | TELOP DEPENDENCY RELATIONSHIP | | RELATED EVENT NUMBER |
| 14 | RESERVATION FIELD | RESERVATION FIELD | |
| 15 | | TRANSMISSION START DATE AND TIME | JAPAN: YYYY/MM/DD/ HH:MM:SS<br>OTHERS: MM/DD/YYYY/ HH:MM:SS |
| 16 | | TRANSMISSION END DATE AND TIME | JAPAN: YYYY/MM/DD/ HH:MM:SS<br>OTHERS: MM/DD/YYYY/ HH:MM:SS |
| 17 | | TRANSMISSION TIME | HH:MM:SS:FF |
| 18 | | TRANSMISSION RESULT | 00:NORMAL, FF:FORCED HALT, OTHER:MALFUNCTION |
| 19 | | RESERVATION FIELD | |

FIG. 17

| No | GPI Out-1 | GPI Out-2 | GPI Out-3 | GPI Out-4 | PDP Power | PDP Input | CREATION DATE AND TIME |
|---|---|---|---|---|---|---|---|
| 01 | ---------- | 5 SECONDS TO END | 20 SECONDS AFTER START | ---------- | OFF | ---------- | 2001/○/○/ ××:△△ |
| 02 | 10 SECONDS TO START | ---------- | ---------- | ---------- | ---------- | ---------- | 2001/○/○/ ××:△△ |
| 03 | ---------- | 5 SECONDS TO END | 20 SECONDS AFTER START | ---------- | ON | 1 | 2001/○/○/ ××:△△ |
| 04 | 10 SECONDS TO START | ---------- | ---------- | ---------- | ---------- | ---------- | 2001/○/○/ ××:△△ |
| 05 | ---------- | 5 SECONDS TO END | 20 SECONDS AFTER START | ---------- | ON | 1 | 2001/○/○/ ××:△△ |
| 06 | 10 SECONDS TO START | ---------- | ---------- | ---------- | ---------- | ---------- | 2001/○/○/ ××:△△ |
| 07 | ---------- | ---------- | ---------- | ---------- | OFF | ---------- | 2001/○/○/ ××:△△ |
| 08 | 10 SECONDS TO START | 5 SECONDS TO END | 20 SECONDS AFTER START | ---------- | ---------- | ---------- | 2001/○/○/ ××:△△ |
| 09 | ---------- | ---------- | ---------- | ---------- | ON | 1 | 2001/○/○/ ××:△△ |
| 10 | 10 SECONDS TO START | 5 SECONDS TO END | 20 SECONDS AFTER START | ---------- | ---------- | ---------- | 2001/○/○/ ××:△△ |

DATA CREATING DEVICE, DATA
REPRODUCING DEVICE, DATA
PROCESSING SYSTEM, AND METHODS
THEREFOR

TECHNICAL FIELD

The present invention relates to a data generation apparatus, a data reproduction apparatus, a data processing system and the methods for managing reproduction forms of content data (multimedia materials), such as motion pictures, still images and text.

BACKGROUND ART

There is a system to display a plurality of content data, such as moving images, still images and text, at a time on a reproduction screen by generating new content data by combining the plurality of content data to be displayed at a time on the data providing side and providing the same to a reproduction apparatus.

However, in such a system, in the case of providing various menus wherein moving images, still images and texts, etc. are partially changed on the reproduced screens, all of the above new content data to be provided to each reproduction apparatus has to be separately created, so that it takes a lot of efforts.

Also, it is necessary that the data providing side always hold the whole content data, and there is a problem of causing a heavy load for that.

DISCLOSURE OF THE INVENTION

An object of the present invention is to provide a data generation apparatus, a data reproduction apparatus, a data processing system and the methods capable of reducing a load on a providing side when providing various content data obtained by combining a plurality of content data.

Also, an object of the present invention is to provide a data generation apparatus, a data reproduction apparatus, a data processing system and the methods capable of reducing a load for storing content data on a providing side when providing various content data obtained by combining a plurality of content data.

To attain the above objects, a first invention is a data generation apparatus for generating reproduction format designation data for designating a reproduction format at a providing destination of a plurality of content data, comprising a data generation means for generating, for respective identification data of said plurality of content data, reproduction format designation data for indicating by associating the identification data, reproduction timing of said content data corresponding to the identification data at said providing destination, and data for specifying other content data to be reproduced at a time with said content data corresponding to the identification data at said providing destination.

Also, said data generation means of the first invention preferably generates said reproduction format designation data including a first data portion including update timing regulation data indicating timing that said providing destination receives new said reproduction format designation data; and a plurality of second data portions provided by corresponding respectively to said plurality of content data, indicating by associating said identification data of corresponding content data, said reproduction timing, and data for specifying said other content data to be reproduced at a time.

A data reproduction apparatus of a second invention comprises an input means for receiving as an input, for respective identification data of a plurality of content data, reproduction format designation data indicating by associating the identification data, reproduction timing of said content data corresponding to the identification data at said providing destination, and data for specifying said other content data to be reproduced at a time with said content data corresponding to the identification data at said providing destination; and a reproduction means for simultaneously reproducing, for said respective identification data indicated by said reproduction format designation data received by said input means, content data corresponding to the identification data, and said other content data corresponding to the identification data at said reproduction timing corresponding to the identification data.

Effects of the data reproduction apparatus of the second invention are as below.

The input means receives as an input, for respective identification data of a plurality of content data, reproduction format designation data indicating by associating the identification data, reproduction timing of said content data corresponding to the identification data at the providing destination, and data for specifying said other content data to be reproduced simultaneously with the content data corresponding to the identification data at the providing destination.

Next, the reproducing means reproduces, for the respective identification data indicated in the reproduction format designation data received by the input means, content data corresponding to the identification data and the other content data corresponding to the identification data simultaneously at the reproduction timing corresponding to the identification data.

A data processing system of a third invention comprises a data generation apparatus for generating reproduction format designation data for designating a reproduction format of a plurality of content data at a providing destination, and a data reproduction apparatus for reproducing based on said reproduction format designation data generated by said data generation apparatus; wherein said data generation apparatus generates, for respective identification data of said plurality of content data, reproduction format designation data indicating by associating the identification data, reproduction timing of said content data corresponding to the identification data at said providing destination, and data for specifying said other content data to be simultaneously reproduced with said content data corresponding to the identification data at said providing destination, and transmits said generated reproduction format designation data to said data reproduction apparatus; and said data reproduction apparatus reproduces, for said respective identification data indicated by said reproduction format designation data received from said data generation apparatus, content data corresponding to the identification data and said other content data corresponding to the identification data at a time at said reproduction timing corresponding to the identification data.

A data generation method of a fourth invention for generating reproduction format designation data for designating a reproduction format at a providing destination of a plurality of content data, comprises a first step for receiving as an input an operation instruction; and a second step for generating, for respective identification data of said plurality of content data, based on said operation instruction received in said first step, reproduction format designation data indicating by associating the identification data, reproduction timing of said content data corresponding to the identification data at said providing destination, and data for specifying said other content data to be simultaneously reproduced with said content data corresponding to the identification data at said providing destination.

A data reproduction method of a fifth invention comprises a first step for receiving as an input, for respective identification data of a plurality of content data, reproduction format designation data indicating by associating the identification data, reproduction timing of said content data corresponding to the identification data at said providing destination, and data for specifying said other content data to be simultaneously reproduced with said content data corresponding to the identification data at said providing destination; and a second step for reproducing, for said respective identification data indicated by said reproduction format designation data received in said first step, content data corresponding to the identification data and said other content data corresponding to the identification data at a time at said reproduction timing corresponding to the identification data.

A data processing method of a sixth invention comprises a first step for generating by a data generation apparatus, for respective identification data of said plurality of content data, reproduction format designation data indicating by associating the identification data, reproduction timing of said content data corresponding to the identification data at said providing destination, and data for specifying said other content data to be reproduced at a time with said content data corresponding to the identification data at said providing destination; a second step for transmitting said reproduction format designation data generated in said first step from said data generation apparatus to a data reproduction apparatus; and a third step for reproducing by said data reproduction apparatus, for said respective identification data indicated in said reproduction format designation data received in said second step, content data corresponding to the identification data and said other content data corresponding to the identification data at a time at said reproduction timing corresponding to the identification data.

BRIEF DESCRIPTION OF DRAWINGS

FIG. 7 is a view for explaining an example of an RFD data creation menu.

FIG. 9 is a view showing a format of a header portion added to a moving image file and a still image file.

FIG. 10 is a view showing a format of a telop file.

FIG. 11 is a view showing a format of an external device control file.

FIG. 13 is a view showing a format of an RFD data header portion and a transmission log header portion.

FIG. 14 is a view showing a format of a body portion of RFD data and transmission log.

FIG. 17 is a view showing a management menu when control of an external device of RFD data is made to be a file.

BEST MODE FOR CARRYING OUT THE INVENTION

Below, an embodiment of the present invention will be explained with reference to the drawings.

Figure 1:
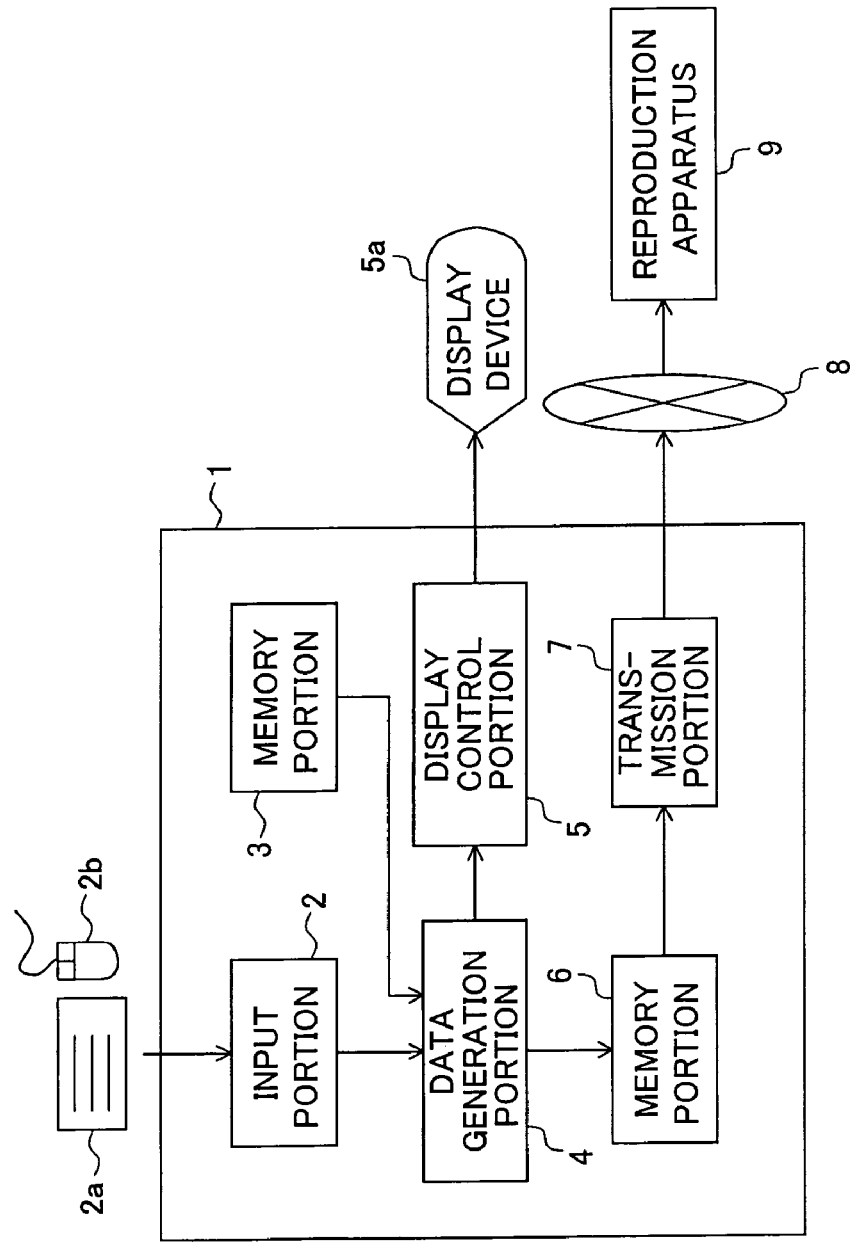
FIG. 1 is a view of the configuration of an RFD data creation apparatus according to an embodiment of the present invention.

FIG. 1 is a view of the configuration of a data processing system of an embodiment of the present invention.

The data processing system shown in FIG. 1 comprises an RFD data creation apparatus 1 and a reproduction apparatus 9, and they are connected via a network 8.

In FIG. 1, the RFD data creation apparatus 1 corresponds to the data generation apparatus, and the reproduction apparatus 9 corresponds to the data reproduction apparatus.

In the data processing system shown in FIG. 1, the RFD data creation apparatus 1 creates RFD (reproduction format designated) data (play list) and sends the same to the reproduction apparatus 9.

Here, the RFD data corresponds to reproduction format designation data of the present invention and indicates by associating, for respective identification data of a plurality of content data (material data), the identification data, reproducing timing of content data corresponding to the identification data in the reproduction apparatus 9, and data for specifying other content data to be reproduced at a time with the content data corresponding to the identification data in the reproduction apparatus 9. Namely, the RFD data designates reproduction formats of a plurality of content data in the reproduction apparatus 9 and does not store the content data itself.

Also, the RFD data creation apparatus 1 or other server device sends content data specified in the RFD data to the reproduction apparatus 9 separately from the RFD data.

Then, the reproduction apparatus 9 performs reproduction by determining reproduction formats of a plurality of content data received from the RFD data creation apparatus 1 or other server device based on the RFD data received from the RFD data creation apparatus 1.

RFD Data Creation Apparatus 1

As show in FIG. 1, the RFD data creation apparatus 1 comprises an input portion 2 for receiving as an input an operation instruction from a user, a memory portion 3 for storing content data, a data generation portion 4 for generating RFD data based on the operation instruction by the user, a display control portion 5 for displaying an RFD data creation menu, a memory portion 6 for storing the created RFD data, and a transmission portion 7 for transmitting the RFD data to the reproduction apparatus 9 via a network 8.

The data generation portion 4 shown in FIG. 1 corresponds to a data generation means of the present invention, the display control portion 5 corresponds to a display control means of the present invention, and the transmission portion 7 corresponds to a control means of the present invention.

The input portion 2 is connected to a keyboard 2a and a mouse 2b and receives an operation instruction by an operation by a user.

The memory portion 3 stores content data, such as moving images, still images and texts for telop.

Figure 2:
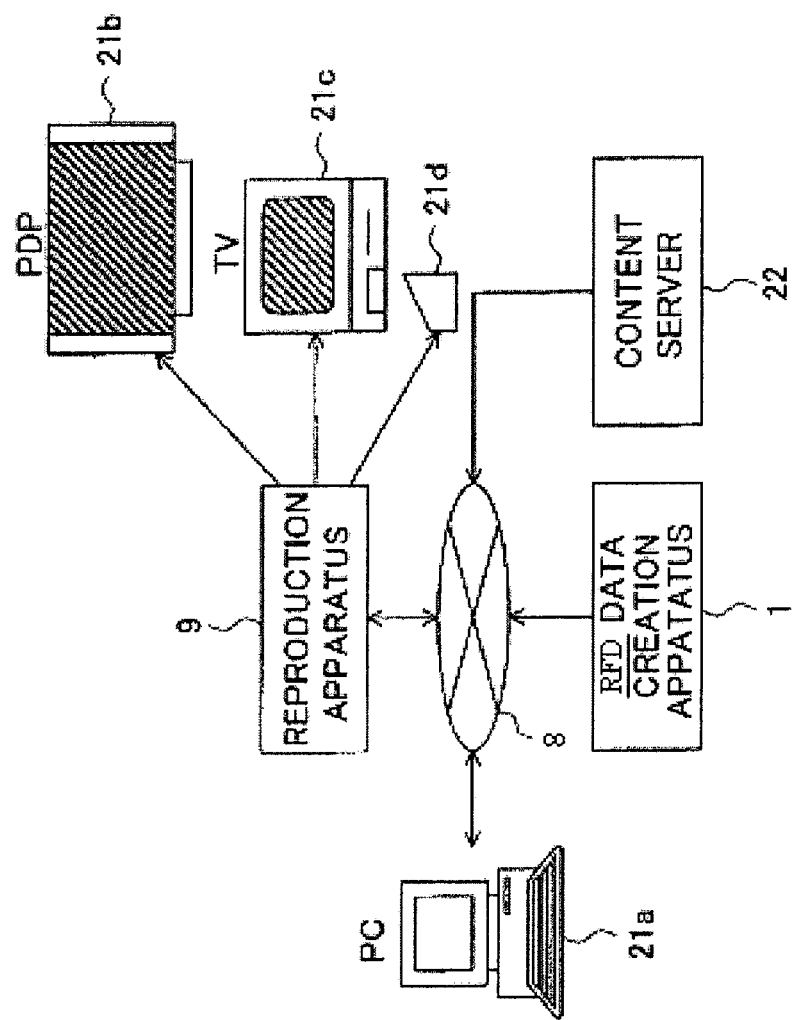
FIG. 2 is a view for explaining a modified example of the embodiment of the present invention.

Note that the case where the content data is stored in the memory portion 3 will be explained as an example in the present embodiment but, as shown in FIG. 2, the content data may be stored in the content server device 22 on the network 8. In this case, the memory portion 3 stores data (address) indicating where content data specified by RFD data exists on the network 8.

By generating RFD data in the RFD data creation apparatus 1 and storing content data in the content server 22 as explained above, a load for storing the content data on the RFD data creation apparatus 1 can be reduced.

Note that, in an example shown in FIG. 2, the reproduction apparatus 9 is connected to output devices, such as a PC (personal computer) 21a, a PDP (plasma display panel) 21b, a television 21c and a speaker 21d, etc.

The data generation portion 4 shown in FIG. 1 generates RFD data based on an operation instruction by the user input from the input portion 2.

The data generation portion 4 generates, for respective identification data of a plurality of content data, RFD data indicating by associating the identification data, reproducing timing of content data corresponding to the identification data in the reproduction apparatus 9, and data for specifying other content data to be reproduced with the content data corresponding to the identification data in the reproduction apparatus 9.

The memory portion 6 stores the RFD data created by the data generation portion 4.

The transmission portion 7 transmits the RFD data stored in the memory portion 6 to the reproduction apparatus 9 via the network 8 at a predetermined date and time.

Also, the transmission portion 7 transmits the content data read from the memory portion 3 to the reproduction apparatus 9.

First, RFD data generation processing in the RFD data creation apparatus 1 will be explained.

Figure 3:
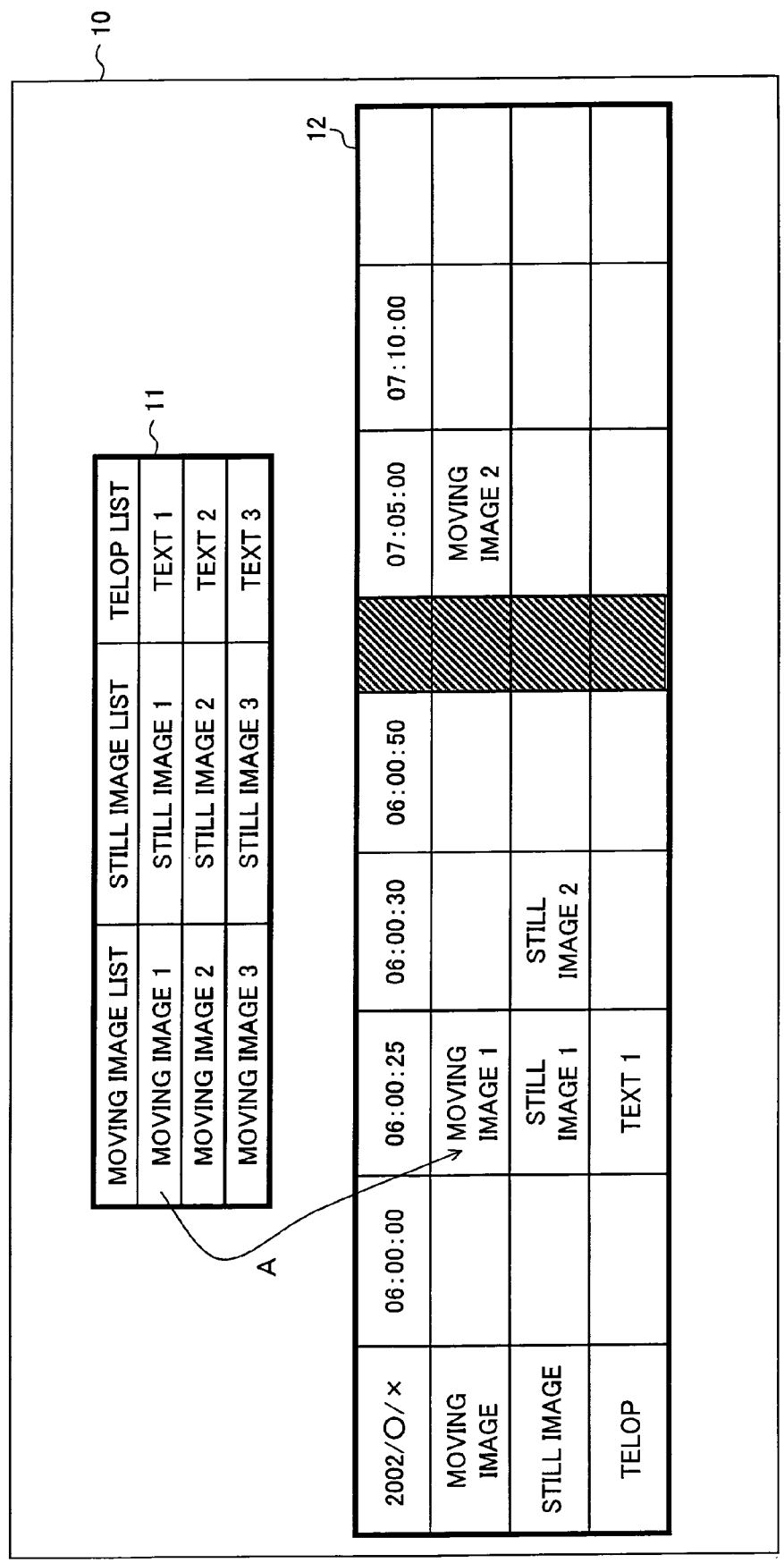
FIG. 3 is a view for explaining a display example when creating RFD data according to the embodiment of the present invention.

FIG. 3 is an example of an input menu 10 displayed on a display device 5a by the display control portion 5 when an instruction of creating RFD data is given by a keyboard and a mouse.

A content selection menu 11 showing a series of selectable content data stored in the memory portion 3 is displayed on the input menu 10 of the display device 5a by the display control portion 5.

Furthermore, an RFD data creation menu 12 is displayed on the input menu 10.

In the RFD data creation menu 12, date and time for performing reproducing processing of content data in accordance with the RFD data to be created and time for carrying out an event (reproduction) by the respective content data are described along the abscissa axis.

Also, the axis of ordinate is divided by attributes of content data, such as a moving image, a still image and telop.

For example, when desiring to reproduce a moving image 1 by the reproduction apparatus 9 at 06:00:25, a user selects the moving image 1 from a moving image list on the content selection menu 11 and pastes on a predetermined field on the RFD data creation menu 12 as shown by an arrow A by a drag and drop operation with a mouse 2b. The operation of pasting on a predetermined field (an input field in the present invention) on the RFD data creation menu 12 is performed in the same way in the case of a still image and telop.

The data generation portion 4 generates RFD data based on the operation by the user.

The thus created RFD data is stored in the memory portion 6.

The RFD data stored in the memory portion 6 is transmitted to the reproduction apparatus 9 by the transmission portion 7 via the network 8 before transmission (reproduction) date and time written in the RFD data and the event (reproduction) is executed in the reproduction apparatus 9 at the specified date and time written in the RFD data.

Figure 4:
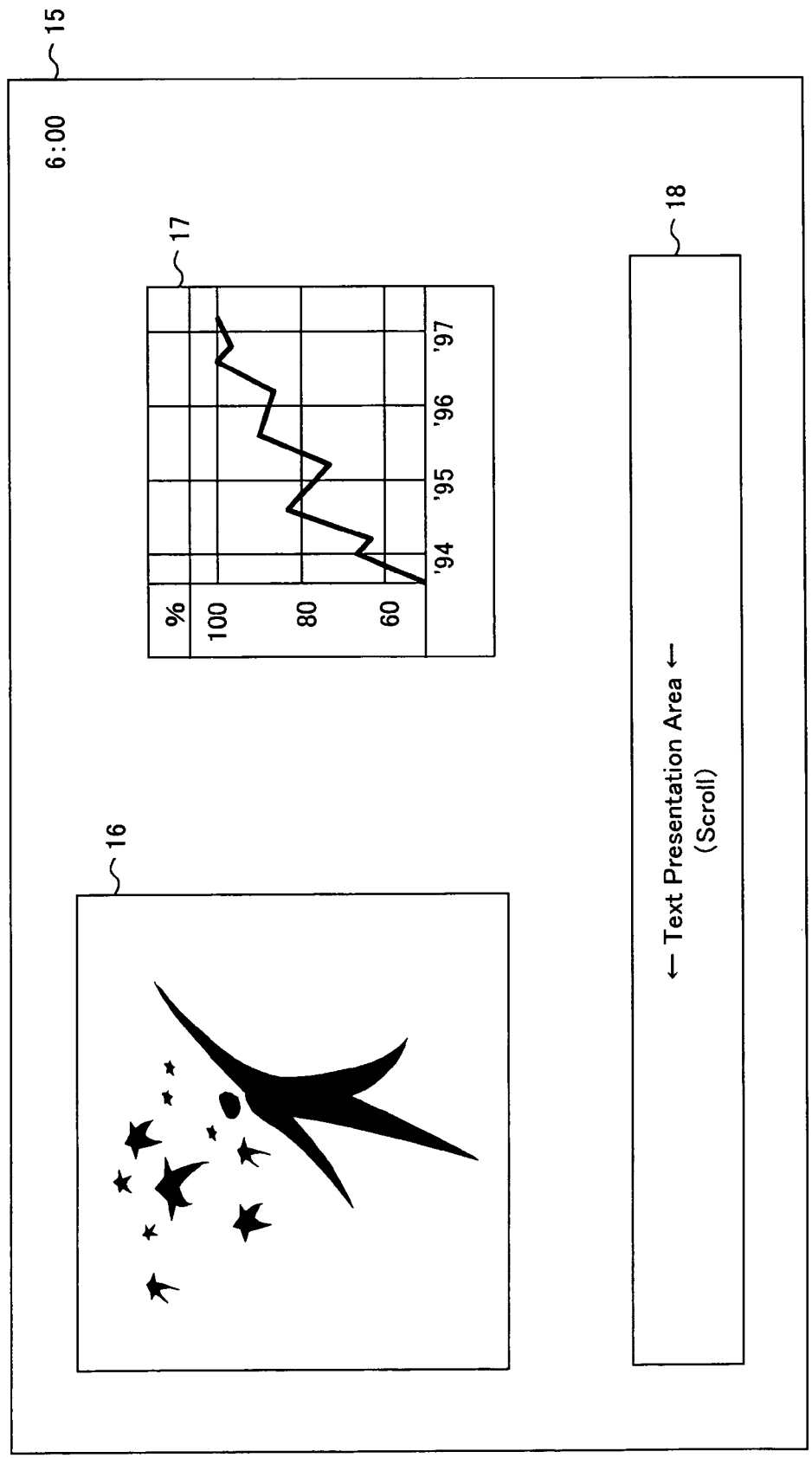
FIG. 4 is a view for explaining an example of a menu reproduced by a reproduction apparatus shown in FIG. 1.

FIG. 4 is an example of a menu reproduced at the time "06:00:25" in the reproduction apparatus 9 by the above operation.

As explained above, since a size of the screen and a position on the screen at the time of reproduction are written in the RFD data, on the screen 15 of a not shown monitor, etc. connected to the reproduction apparatus 9, the event written in the RFD data is executed so that a moving image is displayed on a moving image display field 16, a still image is displayed on a still image display field 17 and a telop is displayed on a telop display field 18 as positions on the screen specified by the RFD data. Note that the still image display field 17 for a still image may be displayed as a background of a moving image and telop.

As explained above, by only creating the RFD data for specifying a display order and the display time, etc. of a moving image, still image and telop, etc. on the screen, the user can realize display combining a moving image, still image and telop without complex editing work.

Also, while a detailed format will be explained later on, the RFD data is written data for associating a plurality of content data to be reproduced at a time.

For example, as shown in FIG. 4, when desiring to display a still image and telop at a time while reproducing a moving image, event numbers of the still image and telop to be displayed at a time are written in an event section indicating execution of the moving image written in the RFD data.

As a result, when performing skip reproduction or shuttle search on a moving image composed of a plurality of files, it is possible to immediately refer to relating event numbers and to attain special reproduction of an event wherein content data having different attributes are combined.

Below, a configuration example of the RFD data creation apparatus 1 shown in FIG. 1 will be explained.

Figure 5:
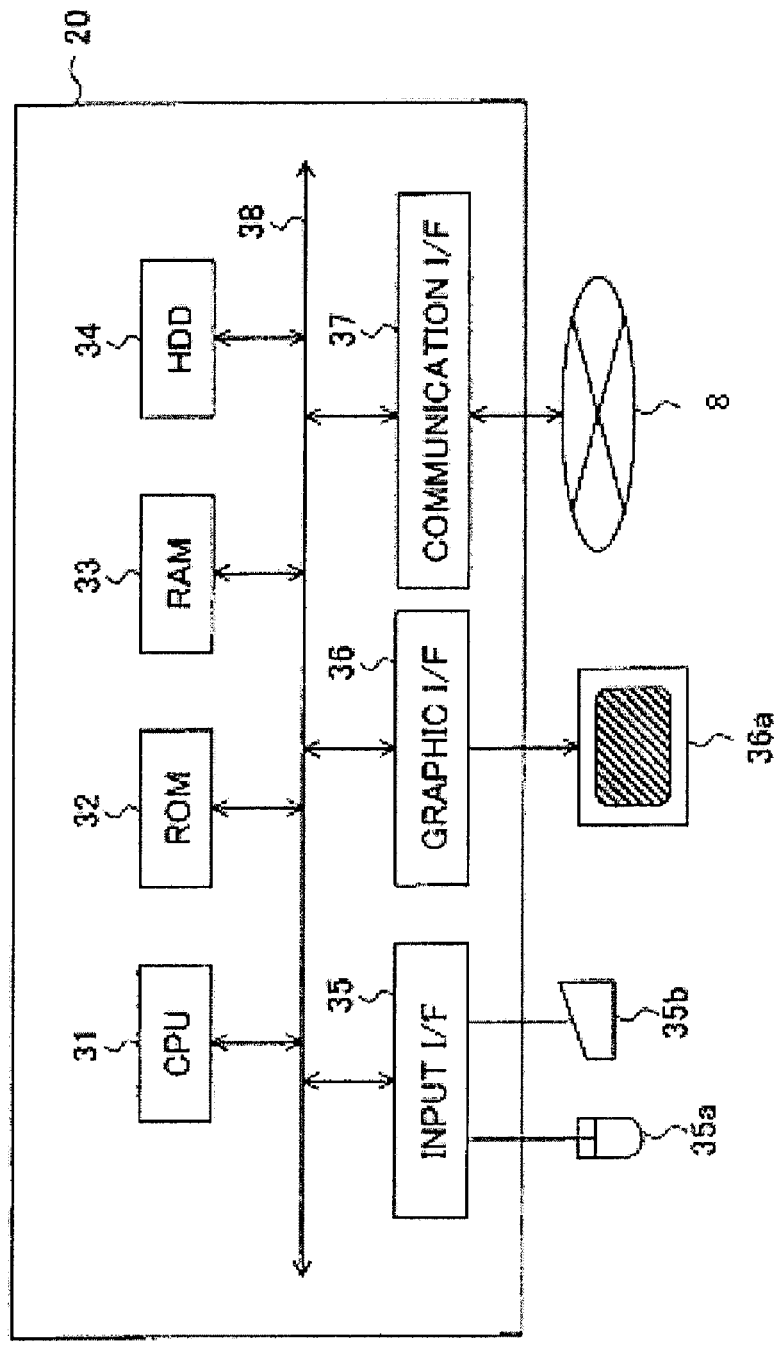
FIG. 5 is a view of a hardware configuration of the RFD data creation apparatus shown in FIG. 1.

FIG. 5 is a view of the hardware configuration of the RFD data creation apparatus 1 shown in FIG. 1.

The RFD data creation apparatus 1 is, for example, a PC (personal computer) and has the configuration wherein a CPU (central processing unit) 31 for controlling the whole apparatus, memories, such as a ROM (read only memory) 32 and a RAM (random access memory) 33, an HDD (hard disk drive) 34, an input interface 35, a graphic interface 36 and a communication interface 37 are connected to a bus 38.

Here, the input interface 35 corresponds to an input portion 2 shown in FIG. 1, the HDD 34 corresponds to a memory portion 3 and memory portion 6 shown in FIG. 1, the CPU 31 corresponds to a data generation portion 4 shown in FIG. 1, the CPU 31 and the graphic interface 36 correspond to a display control portion 5 shown in FIG. 1, and the communication interface 37 corresponds to a transmission portion 7 shown in FIG. 1, The RAM 33 temporarily stores at least a part of programs of an OS (operation system) and application programs executed by the CPU 31.

Also, the ROM 32 stores firmware, etc. which are necessary for activating the HDD 34.

Also, the HDD 34 stores an OS, an application program for creating RFD data, content data, such as moving images, still images and telops, and created RFD data.

The input interface 35 is connected to a mouse 35a and a keyboard 35b. The input interface 35 transmits a signal sent from the mouse 35a and the keyboard 35b to the CPU 31 via the bus 38.

The graphic interface 36 is connected to the monitor 36a. The graphic interface 36 makes an image displayed on a screen of the monitor 36a in accordance with an instruction from the CPU 31.

The communication interface 37 is connected to the network 8. The communication interface 37 transmits created RFD data to the reproduction apparatus 9 via the network 8.

Below, a method of creating RFD data in the RFD data creation apparatus 1 shown in FIG. 5 will be explained.

Figure 6:
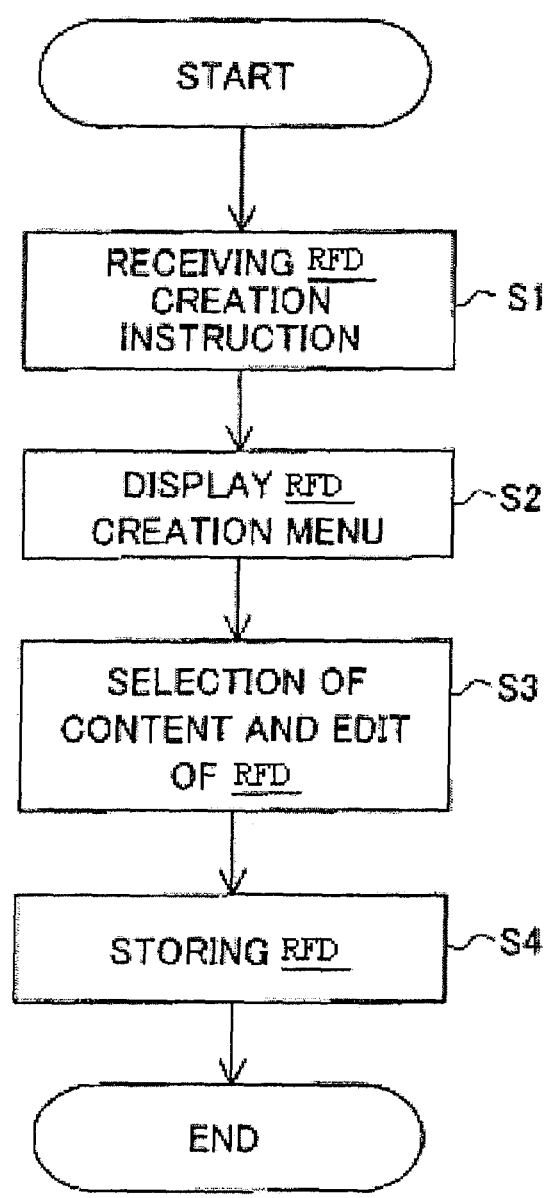
FIG. 6 is a view of a flowchart showing an RFD data creation method.

FIG. 6 is a flowchart showing an RFD data creation method.

[Step ST1]

The CPU 31 receives an instruction of creating RFD data made by the mouse 35a and the keyboard 35b by a user via the input interface 35.

[Step ST2]

In response to the RFD data creation instruction by the user, the CPU 31 executes an application program stored in the HDD 34. As a result, processing is performed in the graphic interface 36 and, for example, an input menu (RFD creation menu) 10 or 40 shown in FIG. 3 or FIG. 7 is displayed on the monitor 36a.

FIG. 7 is an example of an input menu displayed on the monitor 36a wherein the input menu 10 shown in FIG. 4 is shown further in detail.

In FIG. 7, T1 indicates a title, T2 indicates a time, S indicates a size, CN indicates the number of characters, I indicates an event, IN indicates the number of events, R indicates edit, IR indicates urgent reproduction and TR indicates transfer.

As shown in FIG. 7, a content selection window 41 and an RFD data creation window 42 are displayed on the input menu 40. Note that an edit window 42 in FIG. 7 is a window displayed when a "02 sample 2" is selected in the list of the content window 41 and, for example, double clicked or an edit button 43 is pressed.

Also, in the case where automatic reproduction is desired in an emergency of disaster, when an urgent reproduction button 44 is pressed, an emergency program cuts in to be sent to the reproduction apparatus 9.

Also, when a transfer button 45 on an RFD data field is pressed, selected RFD data is transferred to a reproduction apparatus 9 designated by a transfer address 46. Also, when selecting content data in other content selection field and pressing the transfer button, the content data is transferred to a transfer address specified by the transfer address 46.

[Step ST3]

The user performs an edit (creation) operation on RFD data on the RFD data creation menu displayed on the monitor 36a in step ST2.

Then, the CPU 31 generates RFD data in accordance with the operation.

On the RFD data creation menu in FIG. 7, the user selects desired content data from a list of content data on the content selection window 41 with a mouse 35a or keyboard 35b and pastes the material on a field at desired time on the RFD data creation window 42 by a drag-and-drop operation or a copy-and-paste operation with the mouse 35a. Consequently, an event including identification data of the selected content data can be created. By repeating the operation, RFD data composed of a plurality of events can be created.

Furthermore, in the RFD data creation apparatus 1, a control signal for controlling an external device provided on the reproduction apparatus 9 (external device control) side is managed by the RFD data, so that the external device can be controlled.

For example, as shown in FIG. 2, on/off control of a power source of a PDP 21b connected to the reproduction apparatus 9 is possible. Furthermore, it is possible to automatically control floor announcements in a movie theater, etc., open/close of curtains, and turning on/off of lights in synchronization with the RFD data.

[Step ST4]

The CPU 31 writes the RFD data generated in the step ST3 to the HDD 34.

It is also possible to call up the RFD data stored in the HDD 34 and edit again on the RFD data creation menu in FIG. 7.

Next, a file format of each content data will be explained.

A file of content data is generated in the RFD data creation apparatus 1 or the content server device 22.

Figure 8A:
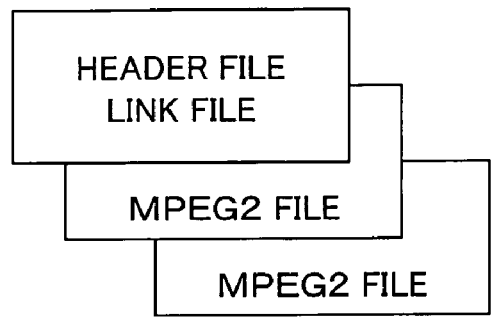
FIG. 8A is a view showing a format of a moving image file.
Figure 8B:
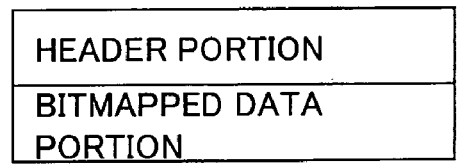
FIG. 8B is a view showing a format of a still image file.
Figure 8C:
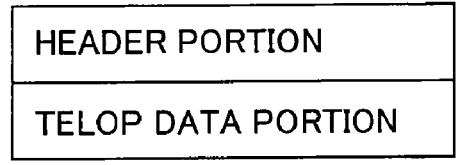
FIG. 8C is a view showing a format of a telop file.
Figure 8D:
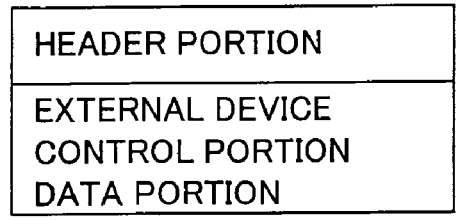
FIG. 8D is a view showing a format of an external device control file.

FIG. 8A, FIG. 8B, FIG. 8C and FIG. 8D are schematic formats of content data. FIG. 8A is a format of a moving image file, FIG. 8B is a format of a still image file, FIG. 8C is a format of a telop file, and FIG. 8D is a format of an external device control file.

In the format of a moving image file, for example, a file of the MPEG (moving picture coding experts group) 2 format added with a header file and a link file is dealt as one file.

The format of a still image, the format of a telop, and the format of an external device are same as the format wherein a header portion is added to a data portion.

FIG. 9 is a format of the header portion added to a moving image file and a still image file.

As shown in FIG. 9, the header portion is written a version, title, and update date and time, etc. of the file.

The reproduction apparatus 9 receives a new content data file (update file) at the update date and time shown in FIG. 8 indicated in the header portion of the received file.

FIG. 10 is a format of a telop file.

In addition to a file version and a country code of the header portion (H01, H02), a title name, update date and time, the number of characters, display classification, assignment of a background color and character color, and a content of the telop, etc. are written as the data portion (B01 to 07).

FIG. 11 is a format of an external device control file.

In addition to a file version and a country code of the header portion (H01, H02), a title name, update date and time, control classification: GPI output or PDP control, a content of control, etc. are written as the data portion (B02 to B05).

The reproduction apparatus 9 controls the external device at the same timing being in synchronization with reproduction of the content data based on the external device control file corresponding to reproducing timing of the content data to be reproduced in the RFD data.

Below, formats of RFD data and a transmission log generated by the RFD data creation apparatus 1 will be explained.

Here, the transmission log is a log when the RFD data is transmitted by the communication interface 37 to the reproduction apparatus 9 via the network 8.

Figure 12A:
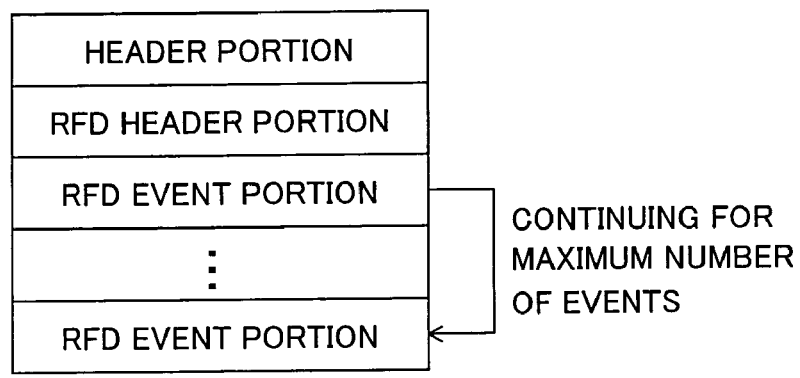
FIG. 12A is a view showing a format of RFD data.
Figure 12B:
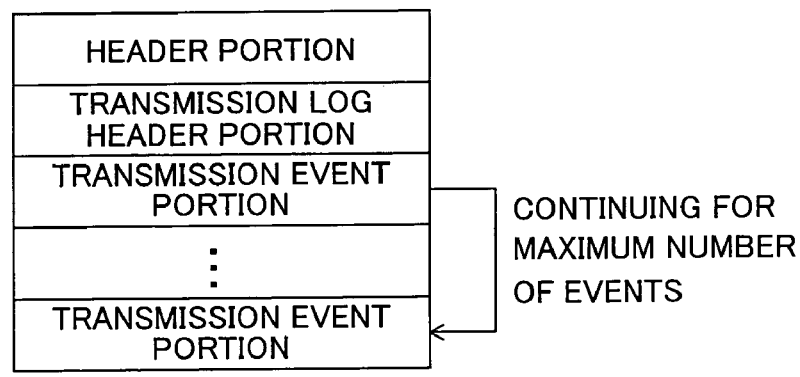
FIG. 12B is a view showing a format of a transmission log.

FIGS. 12A and FIG. 12B are schematic formats of the RFD data and the transmission log. FIG. 12A is a format of the RFD data, and FIG. 12B is a format of the transmission log.

The RFD data and the transmission log have a format comprising RFD data (RFD) header portion or a transmission log header portion and RFD event portion or a transmission log event portion.

FIG. 13 is a format of the RFD header portion and the transmission log header portion shown in FIG. 12A and FIG. 12B.

The header portion corresponds to a first data portion of the present invention.

As shown in FIG. 13, the header portion is written the total number of events, transmission start date and time indicating reproduction start date and time of the content data using the RFD data in the reproduction apparatus 9, and transmission end date and time, etc. Also, an item of the RFD data is written designation of transmission day, etc.

FIG. 14 is a format of a body portion of the RFD data and transmission log, which corresponds to the RFD event portion and transmission log event portion in FIG. 12.

The body portion corresponds to a second data portion of the present invention.

As shown in FIG. 14, the event portion is written a file classification, file name, title name, transmission time, scheduled date and time of transmission, spot accumulated data, display position and display size, etc.

The file classification indicates classification of content data, such as a moving image, still image and telop, managed by the event and an external device control file.

The file name indicates identification data (identification data of the present invention) of content data, such as a moving image, still image and telop, managed by the event and an external device control file.

The scheduled time of transmission indicates date and time (reproduction timing) when the reproduction apparatus 9 reproduces the content data relating to the event and controls an external device based on the external device control file.

The scheduled time of transmission is generated by the data generation portion 4 shown in FIG. 1 based on a time zone on which identification data of the content data is assigned, for example, on the input menu shown in FIG. 3 and FIG. 7.

The spot accumulation data indicates the number of frames from an image frame of the top event in the RFD data to the first frame of a moving image of the target event.

The display position indicates a position of displaying of images of a moving image, still image and telop, etc. on the reproduction screen of the reproduction apparatus 9 in accordance with the content data.

The display size indicates a size of images of a moving image, still image and telop, etc. displayed on the reproduction screen in accordance with the content data.

Also, there is an item of a moving image dependency relationship, still image dependency relationship and telop dependency relationship in the RFD data.

The item indicates content data indicated by the file name of the target event and identification data of the event portion relating to a moving image, still image and telop to be reproduced at a time (corresponding to "data for specifying other content data to be reproduced at a time on the providing destination" in the present invention).

For example, when reproducing a moving image of event number 1, an event number of the telop or still image, etc. to be reproduced or displayed simultaneously at that time.

The item of the motion image dependency relationship, still image dependency relationship and telop dependency relationship is generated on the input menu shown in FIG. 3 and FIG. 7 by the generation portion 4 shown in FIG. 1 based on identification data of a plurality of content data assigned in the same time zone and scheduled to be reproduced at a time.

As a result, even when skipping to any event or performing shuttle search, it is possible to refer to relating information of a moving image, still image and telop for each event, so that it becomes possible to display by associating a corresponding still image, telop and moving image after the skipping and shuttle search between RFD data.

Figure 15A:
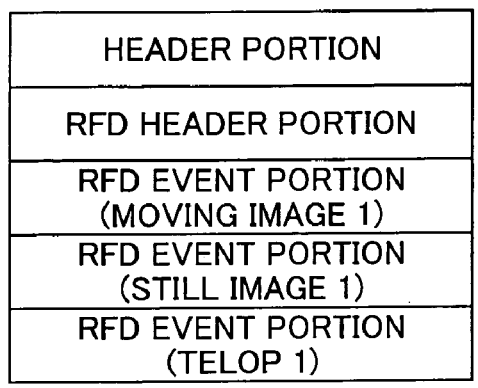
FIG. 15A is a view showing an example of RFD data.

In the present embodiment, when reproducing a moving image 1, still image 1 and telop 1 at a time, as shown in FIG. 15A, the RFD data creation apparatus 1 arranges RFD event portions of the moving image 1, still image 1 and telop 1 continuously in the RFD data shown in FIG. 12.

Figure 15B:
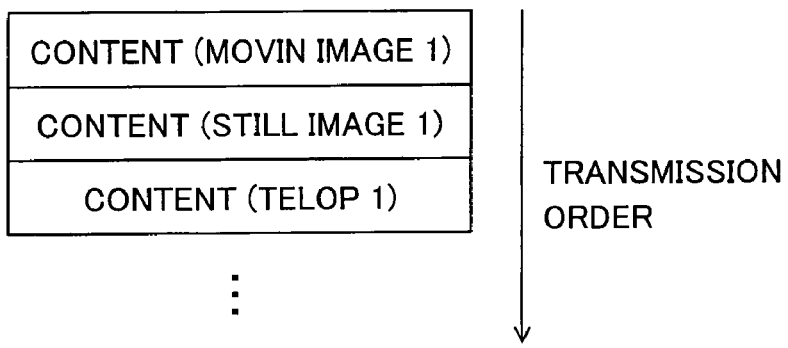
FIG. 15B is a view for explaining a transmission order of content data.

As shown in FIG. 15B, the RFD data creation apparatus 1 controls file data (content data) of the moving image 1, still image 1 and telop 1 to be transmitted to the reproduction apparatus 9 in order via the network 8.

Figure 16:
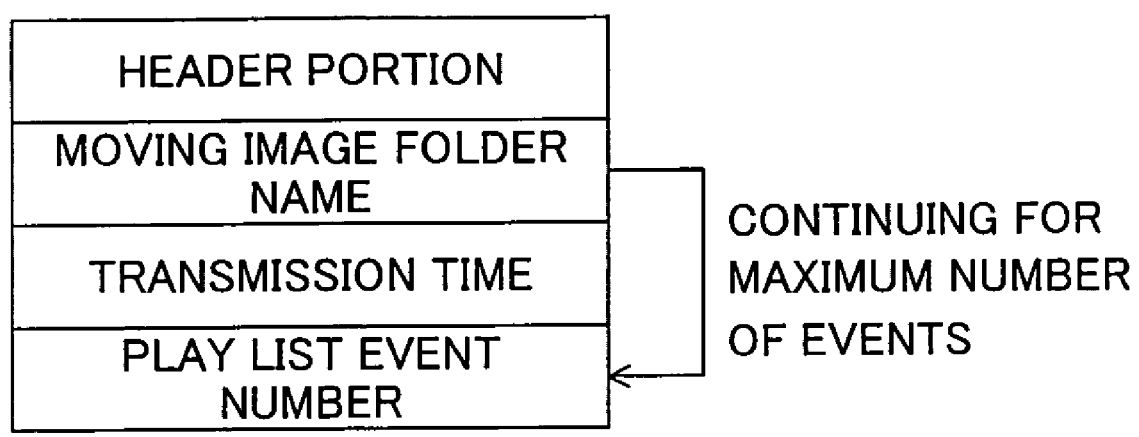
FIG. 16 is a view for explaining a moving image sequence list which is created when file classification of RFD data is a moving image.

FIG. 16 is a moving image sequence list which is created when the file classification of the RFD data is a moving image (1).

In this way, the moving image sequence list may be created by extracting only moving files in the RFD data and recording in the HDD 34. As a result, shuttle search and skip reproduction of a plurality of moving image files can be controlled without taking out a black image or a freeze image between files.

FIG. 17 is a management menu when control of an external device of the RFD data is made to be a file.

By displaying as a list on the management menu in this way, it is possible to call up freely from the HDD 34 and operationality for the user can be improved.

As a result, for example, by turning on/off of the PDP 21b, switching an input, and generating a signal to the outside by the GPI only when RFD data continues, control of turning on/off of floor announcements in a movie theater, open/close of curtains, and turning on/off of lights can be performed in synchronization with the RFD data.

Reproduction Apparatus 9

Below, the hardware configuration of the reproduction apparatus 9 shown in FIG. 1 will be explained.

Figure 18:
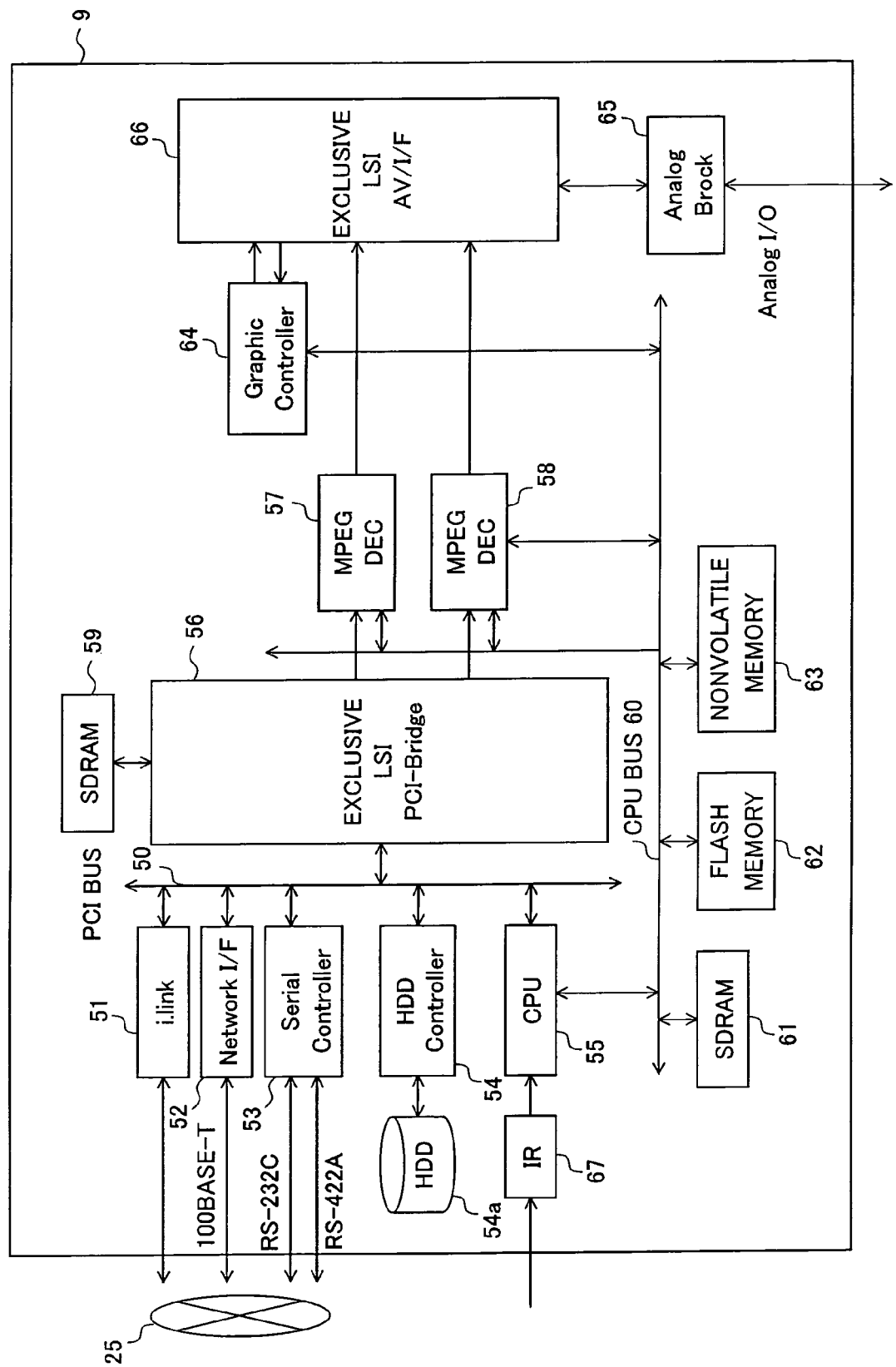
FIG. 18 is a view of a hardware configuration of the reproduction apparatus shown in FIG. 1.

FIG. 18 is a view of the hardware configuration of the reproduction apparatus 9 shown in FIG. 1.

A PCI (peripheral component interconnect) bus 50 is connected to an i.LINK (i.LINK is a registered trademark of the Sony Corporation) terminal 51 of the IEEE 1394 standard for controlling and transferring AV data, a network interface 52 for connecting to the network 8 with an Ethernet cable, such as 100 BASE-T, a serial controller for serial communication based on the RS-232C standard and RS-422A standard, a hard disk controller 54 for controlling an HDD 54a, a CPU 55 and a PCI bridge 56. Furthermore, the PCI bridge 56 is connected to two MPEG decoders 57 and 58, and an SDRAM (synchronous dynamic random access memory) 59 for AV management.

The i.LINK terminal 51 shown in FIG. 18, the network interface 52 or the serial controller 53 for serial communication corresponds to an input means of the present invention, and the CPU 55 and the MPEG decoders 57 and 58 correspond to a reproduction means of the present invention.

The CPU bus 60 is connected to memories, such as an SDRAM 61, a flash memory 62 and a nonvolatile memory 63, two MPEG decoders 57 and 58, and graphic controller 64 in addition to the CPU 55.

Furthermore, an analog block 65 is provided as an analog input/output and connected to an audio/video interface 66. Also, the audio/video interface 66 is connected to the MPEG decoders 57 and 58 and the graphic controller 64.

Furthermore, the reproduction apparatus 9 is provided with a remote commander signal receiving portion (hereinafter, referred to as IR) 67 for receiving an instruction from a user by an infrared remote commander and transfer the instruction from the remote commander to the CPU 55.

The HDD 54*a* stores RFD data transmitted from the above RFD data creation apparatus 1 in addition to storing content data of a moving image, still image and text for telop, etc. received via the network 8.

Firmware is executed by a program recorded on the flash memory 62 on the CPU bus 60. The flash memory 62 is mounted a driver for accessing to the HDD 54*a*, a driver for using the Ethernet, and various firmware for realizing a maintenance function. After being activated, the firmware of the flash memory 62 searches files on the HDD 54*a* and detects application firmware to be executed. Continuously, the firmware from the HDD 54*a* is deployed in the SDRAM 61 and the deployed application firmware is executed.

Recording and reproducing of a moving image and controlling of an output of a still image are performed by commands from the Ethernet, serial communication, the remote commander and a control panel. Also, a method of storing a transmission list inside and starting the transmission list by a trigger of time or the remote commander may be used.

Reproduction or display of content data in the reproduction apparatus 9 will be explained.

When RFD data is received at the network interface 52 from the RFD data creation apparatus 1 via the network 8, it is recorded in the HDD 54*a* under control of the CPU 55.

The CPU 55 takes out content data to be used from the HDD 54*a* at predetermined time and with a predetermined screen size based on description in the RFD data, performs processing in the graphic controller 64, etc. and outputs to the PDP 21*b*, etc. to display.

For example, in the case of reproducing a moving image of the MPEG2 format, when a reproduction command is received from the CPU 55, designated video data is searched from files recorded in the HDD 54*a* and the data is successively transferred to the PCI bridge 56.

The transfer is performed by the hard disk controller 54 under control of the CPU 55. In the PCI bridge 56, data is deployed in the SDRAM 59 as a memory for AV management. The PCI bridge 56 transfers data to the MPEG decoders 57 and 58 and a not shown audio decoder at a constant rate in synchronization with the real-time.

The CPU 55 performs transfer by estimating a data consumption amount of the SDRAM 59 of the PCI bridge 56 from the real-time, successively reading data from the HDD 54*a*, and transferring to the SDRAM 61 so as not to underflow or overflow the data.

The CPU 55 reproduces the content data based on the RFD event portion shown in FIG. 12 and FIG. 14 in the RFD data.

The CPU 55 performs reproduction processing on the content data corresponding to a file name of the RFD event portion so as to be displayed at the scheduled date and time of transmission, at the display position and display size.

At this time, the CPU 55 simultaneously reproduces content data corresponding to the RFD event portion indicated in a dependency relationship of a moving image, still image and telop of the RFD event portion.

Also, when the RFD event portion relates to external device control data, the CPU 55 controls the external device based on the external device control data at the scheduled date and time of transmission.

Furthermore, when the RFD event portion relates to a moving image of the content data, the CPU 55 counts the number of frames based on spot accumulation data and determines timing of starting reproduction of the moving image.

Here, by using two decoders, such as the MPEG decoders 57 and 58, two image data can be connected seamlessly with frame accuracy. The MPEG 2 compresses data by estimating a motion from adjacent image data.

Accordingly, there is a part where image data cannot be built alone in some frames. When an edit point is designated at such a position, video cannot be connected to be a normal image.

Thus, by using two MPEG decoders 57 and 58 and providing a video switcher to a decoder output portion, cut edit at any point becomes possible by decoding each video data separately, performing deployment of compressed image individually and normally, and switching by the external switcher in an analog way.

As explained above, since identification data of an event portion of other content data to be simultaneously reproduced is written by being associated with identification data of respective content data in the RFD data, the reproduction apparatus 9 can specify such other content data easily based thereon.

As a result, when performing skip reproduction and shuttle search in a moving image composed of a plurality of files, it is possible to immediately refer to relating event numbers and special reproduction of an event wherein content data having different attributes are combined.

Also, when a user inputs to perform shuttle search or skip reproduction with a remote commander by receiving a moving image sequence list created by extracting only moving files specified by the RFD data as shown in FIG. 16 and reproducing by the decoders 57 and 58 based on the description, shuttle search and skip reproduction of a plurality of moving image files can be controlled without taking out a black image and freeze image between files.

Also, as explained above, the RFD data manages control signals for controlling an external device, and the CPU 55 controls by the serial controller 53 turning on/off of a power source of the external device, such as the PDP 21*b*, and switching inputs.

Furthermore, due to the provision of the GPI terminal, etc., for example, open/close of curtains and turning on/off of lights in a movie theater or theater can be automatically performed in accordance with the RFD data, so that a reduction of manpower, costs and energy consumption can be expected.

Also, as explained by using FIG. 15A, when reproducing the moving image 1, still image 1 and telop 1 at a time, RFD event portions of the moving image 1, still image 1 and telop 1 are sequentially arranged in the RFD data, and file data (content data) of the moving image 1, still image 1 and telop 1 are transmitted to the reproduction apparatus 9 in order via the network 8. Therefore, the reproduction apparatus 9 can start reproduction at an early stage at timing of receiving the final data of a plurality of file data to be simultaneously reproduced.

According to the content data reproduction system of the present invention, a system below can be attained.

Figure 19:
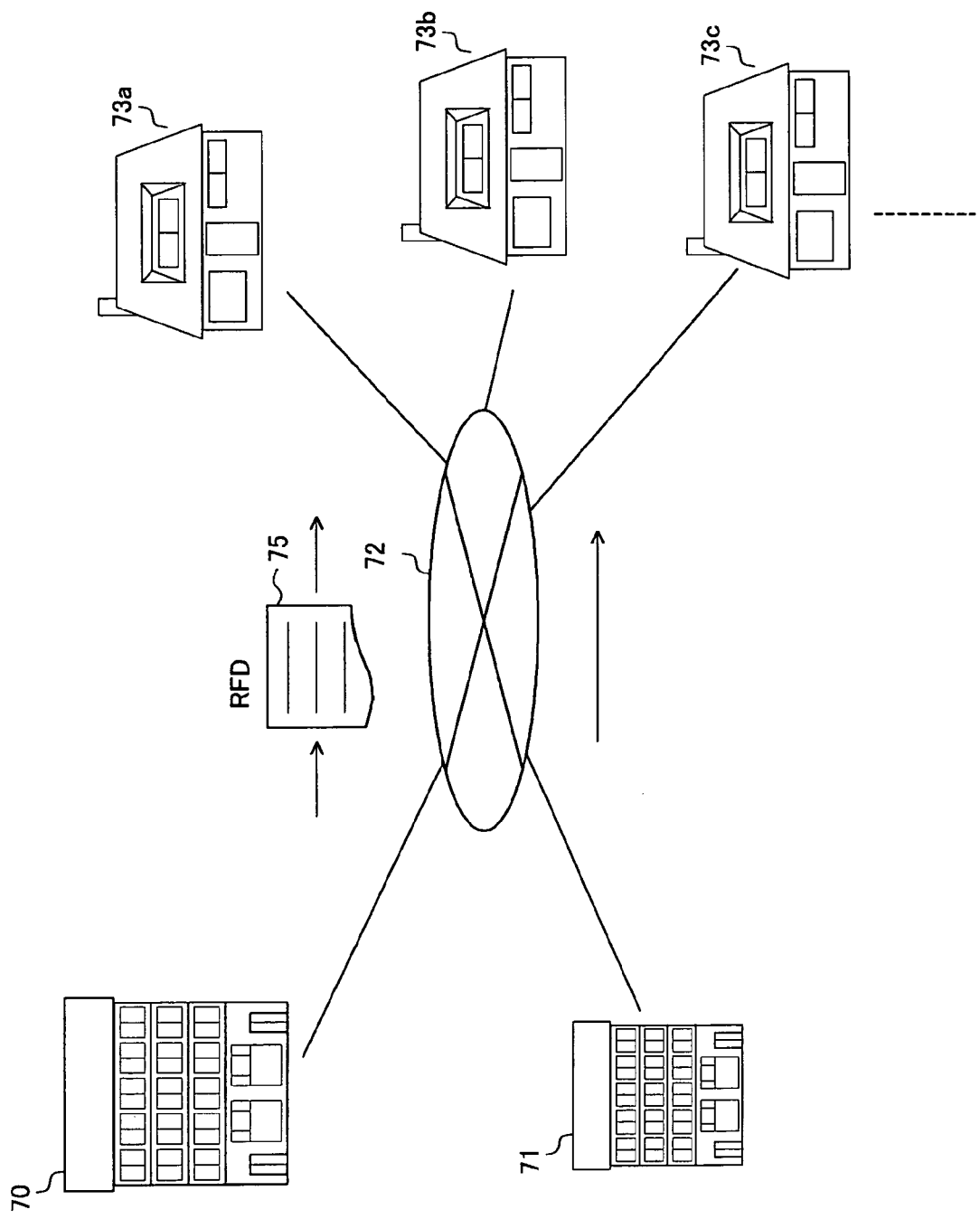
FIG. 19 is a view for explaining a network advertisement system wherein the present invention is applied.

FIG. 19 is a network advertisement system.

The network advertisement system comprises a head office 70 having the above RFD data creation apparatus 1, a content distributor 71 for distributing content, and shops 73*a*, 73*b* and 73*c* having the above reproduction apparatus 9, and these are connected via a network 72.

The head office 70 having the RFD data creation apparatus 1 sends RFD data to the shops 73*a*, 73*b* and 73*c* having the above reproduction apparatus 9 via the network 72. Along with this, advertisement content is sent from the content distributor 71, and the advertisement content can be automatically executed in accordance with the RFD data 75 in the shops.

Figure 20:
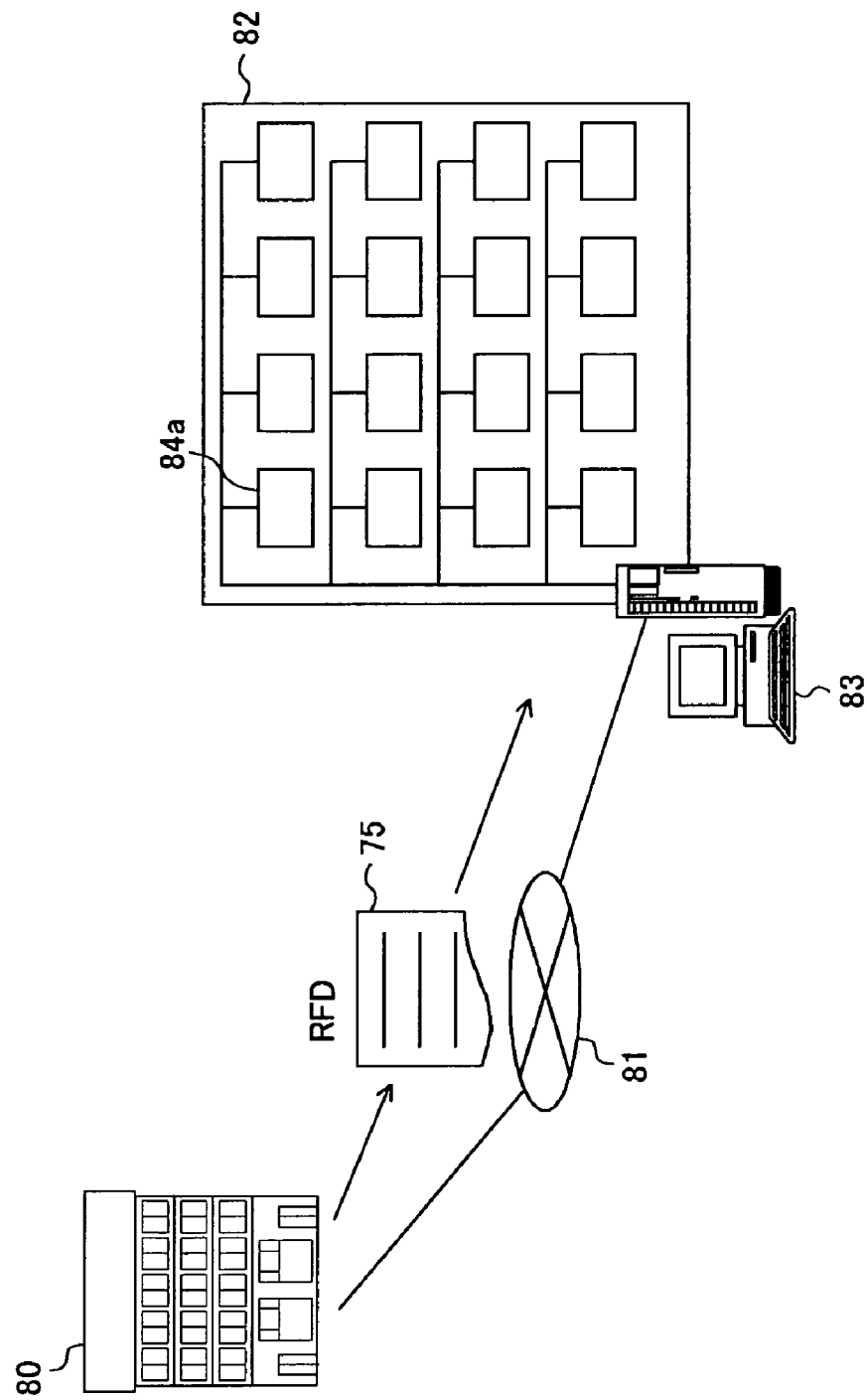
FIG. 20 is a view for explaining a training system wherein the present invention is applied.

FIG. 20 is a training system adopted in companies, etc.

The training system comprises a head office 80 for supplying content and creating RFD data 75, and a plurality of reproduction apparatuses 84a connected by a LAN with a server 83 installed in a company 82 connected to the head office 80 via a network 81.

According to the above configuration, it is possible to automatically reproduce content for training in the plurality of reproduction apparatuses 84a installed in the company 82 in accordance with description of the RFD data. Here, the reproduction apparatus 84a has the same configuration as the above reproduction apparatus 9.

Also, in a museum, etc., it is also possible to realize a system of providing a reproduction apparatus for each exhibit to automatically reproduce presentation content for the exhibit at a scheduled time.

As explained above, according to the data processing system of the present embodiment, RFD data is generated in the RFD data creation apparatus 1 and sent to the reproduction apparatus 9 and, separately from that, content data is sent to the reproduction apparatus 9. Therefore, when changing a reproduction menu of the reproduction apparatus 9 or providing different reproducing menus to a plurality of reproduction apparatuses 9, it is sufficient to change only the RFD data in the RFD data creation apparatus 1, so that a load on the RFD data creation apparatus 1 can be reduced.

Also, according to the data processing system of the present embedment, as shown in FIG. 2, by providing content data from the content server device 22 to the reproduction apparatus 9, it becomes unnecessary for the RFD data creation apparatus 1 to store the content data itself, so that a load for storing on the RFD data creation apparatus 1 can be reduced.

Also, according to the data processing system of the present embodiment, since information indicating a dependency relationship between other content data to be reproduced simultaneously is written in the RFD data, in the case of performing skip reproduction or shuttle search in a moving image composed of a plurality of files in the reproduction apparatus 9, it is possible to immediately refer to relating event numbers and to perform special reproduction of an event, wherein content data having different attributes are combined, at a high speed.

Also, according to the data processing system of the present embodiment, since a control signal for controlling an external device is managed by RFD data, it is possible to automatically control the external device in synchronization with the RFD data. As a result, an unattended operation of the external device becomes possible and a reduction of costs can be expected. Also, energy conservation can be expected.

INDUSTRIAL APPLICABILITY

As explained above, the data generation apparatus, a data reproduction apparatus, a data processing system and the methods are suitable to the case of managing reproduction formats of content data, such as a moving image, still image and text.

The invention claimed is:

1. A data generation apparatus for generating reproduction format designation data for specifying a reproduction format at a providing destination of a plurality of content data, comprising:
    data generation means for generating, for respective identification data of said plurality of content data, reproduction format designation data for indicating by associating the identification data, reproduction timing of said content data corresponding to the identification data at said providing destination, and data for specifying additional content data to be reproduced at a time with said content data corresponding to the identification data at said providing destination,
    wherein said identification data reproduced is written in RFD (reproduction format designated) data and executed so that a moving image is displayed on a moving image display field, a still image is displayed on a still image display field and a telop is displayed on a telop display field as positions on a screen specified by said RFD data, and
    wherein said RFD data, which does not contain the content data, specifies a display order and display time, which is utilized when the plurality of content data, having different attributes, are combined.

2. A data generation apparatus as set forth in claim 1, wherein:
    said data generation means generates said reproduction format designation data comprising:
    a first data portion including update timing regulation data indicating that said providing destination receives new said reproduction format designation data; and
    a plurality of second data portions provided by corresponding content data, indicating said identification data of corresponding content data, said reproduction timing, and data for specifying said additional content data to be reproduced at a time.

3. A data generation apparatus as set forth in claim 2, wherein
    said data generation means generates said reproduction format designation data including identification data of said second data portion to be simultaneously reproduced as data for specifying said additional content data to be simultaneously reproduced.

4. A data generation apparatus as set forth in claim 2, wherein:
    when said content data is image data, said data generation means generates said second data portion further including data indicating a display position and a display size of said image data.

5. A data generation apparatus as set forth in claim 1, further comprising:
    a control means for controlling to transmit said reproduction format designation data generated by said data generation means to said providing destination.

6. A data generation apparatus as set forth in claim 1, further comprising:
    a control means for controlling transmission of said plurality of content data to be reproduced simultaneously to said providing destination.

7. A data generation apparatus as set forth in claim 1, comprising:
    a display control means for regulating said reproduction timing, having input fields for specifying said plurality of content data to be reproduced at the same reproduction timing, and controlling display of an input menu provided by said plurality of input fields in accordance with said reproduction timing;
    wherein said data generation means generates, for each of said identification data of said plurality of content data input to said input field on said input menu displayed, said reproduction format designation data indicating the content data with data specifying said additional content data to be simultaneously reproduced.

8. A data generation apparatus as set forth in claim 1, wherein said content data is at least one data of said moving image, said still image and text.

9. A data generation apparatus as set forth in claim 1, wherein said data generation means generates said reproduction format designation data by associating control data for controlling an apparatus of said providing destination to control timing of the apparatus.

10. A data generation apparatus as set forth in claim 1, wherein, when said content data is moving image data, reproduction format designation data is generated indicating the number of frames from a predetermined frame to a frame to be reproduced first in the moving image.

11. A data reproduction apparatus, comprising:
input means for receiving as an input, for respective identification data of a plurality of content data, reproduction format designation data associating the identification data, reproduction timing of said content data corresponding to the identification data at a providing destination, and data for specifying additional content data to be reproduced at a time with said content data corresponding to the identification data at said providing destination; and
reproduction means for simultaneously reproducing content data corresponding to the identification data, and said additional content data corresponding to the identification data at said reproduction timing corresponding to the identification data,
wherein said identification data reproduced is written in RFD (reproduction format designated) data and executed so that a moving image is displayed on a moving image display field, a still image is displayed on a still image display field and a telop is displayed on a telop display field as positions on a screen specified by said RFD data, and
wherein said RFD data, which does not contain the content data, specifies a display order and display time, which is utilized when the plurality of content data, having different attributes, are combined.

12. A data reproduction generation apparatus as set forth in claim 11, wherein said content data is at least one data of said moving image, said still image and text.

13. A data reproduction apparatus as set forth in claim 11, further comprising:
when said reproduction format designation data indicates by further associating control data for controlling an apparatus of said providing destination control means for controlling said apparatus based on control data corresponding to the reproduction timing.

14. A data reproduction apparatus as set forth in claim 11, wherein:
when said content data is moving image data and said reproduction format designation data indicates a frame to be reproduced first in the moving image, said reproduction means determines timing of starting reproduction of said moving image based on spot accumulation data.

15. A data processing system, comprising:
a data generation apparatus for generating reproduction format designation data for specifying a reproduction format of a plurality of content data at a providing destination; and
a data reproduction apparatus for reproducing based on said reproduction format designation data generated by said data generation apparatus,
wherein said data generation apparatus generates, for respective identification data of said plurality of content data, reproduction format designation data indicating by associating the identification data, reproduction timing of said content data corresponding to the identification data at said providing destination, and data for specifying said additional content data to be simultaneously reproduced with said content data corresponding to the identification data at said providing destination, and transmits said generated reproduction format designation data to said data reproduction apparatus,
wherein said data reproduction apparatus reproduces, for said respective identification data indicated by said reproduction format designation data received from said data generation apparatus, content data corresponding to the identification data and said additional content data corresponding to the identification data at a time at said reproduction timing corresponding to the identification data,
wherein said identification data is written in RFD (reproduction format designated) data and executed so that a moving image is displayed on a moving image display field, a still image is displayed on a still image display field and a telop is displayed on a telop display field as positions on a screen specified by said RFD data, and
wherein said RFD data, which does not contain the content data, specifies a display order and display time, which is utilized when the plurality of content data, having different attributes, are combined.

16. A data generation method for generating reproduction format designation data for specifying a reproduction format at a providing destination of a plurality of content data, comprising:
a first step for receiving as an input an operation instruction;
a second step for generating, for respective identification data of said plurality of content data, based on said operation instruction received in said first step, reproduction format designation data indicating by associating the identification data, reproduction timing of said content data corresponding to the identification data at said providing destination, and data for specifying said additional content data to be simultaneously reproduced with said content data corresponding to the identification data at said providing destination;
writing said identification data in RFD (reproduction format designated) data, which does not contain the content data;
displaying a moving image on a moving image display field;
displaying a still image on a still image display field;
displaying a telop on a telop display field as positions on a screen specified by said RFD data; and
specifying a display order and display time, which is utilized when the plurality of content data, having different attributes, are combined.

17. A data reproduction method, comprising:
a first step for receiving as an input, for respective identification data of a plurality of content data, reproduction format designation data indicating by associating the identification data, reproduction timing of said content data corresponding to the identification data at said providing destination, and data for specifying said additional content data to be simultaneously reproduced with said content data corresponding to the identification data at said providing destination;
a second step for reproducing, for said respective identification data indicated by said reproduction format designation data received in said first step, content data corresponding to the identification data and said additional content data corresponding to the identification data at a time at said reproduction timing corresponding to the identification data;

writing said identification data in RFD (reproduction format designated) data, which does not contain the content data;

displaying a moving image on a moving image display field;

displaying a still image on a still image display field;

displaying a telop on a telop display field as positions on a screen specified by said RFD data; and specifying a display order and display time, which is utilized when the plurality of content data, having different attributes, are combined.

18. A data processing method, comprising:

a first step for generating by a data generation apparatus, for respective identification data of said plurality of content data, reproduction format designation data indicating by associating the identification data, reproduction timing of said content data corresponding to the identification data at said providing destination, and data for specifying said additional content data to be reproduced at a time with said content data corresponding to the identification data at said providing destination;

a second step for transmitting said reproduction format designation data generated in said first step from said data generation apparatus to a data reproduction apparatus;

a third step for reproducing by said data reproduction apparatus, for said respective identification data indicated in said reproduction format designation data received in said second step, content data corresponding to the identification data and said additional content data corresponding to the identification data at a time at said reproduction timing corresponding to the identification data;

writing said identification data in RFD (reproduction format designated) data, which does not contain the content data;

displaying a moving image on a moving image display field;

displaying a still image on a still image display field;

displaying a telop on a telop display field as positions on a screen specified by said RFD data; and specifying a display order and display time, which is utilized when the plurality of content data, having different attributes, are combined.

* * * * *